United States Patent [19]

Takahashi et al.

[11] 4,080,543

[45] Mar. 21, 1978

[54] WINDING ASSEMBLY OF GAP WINDING TYPE ELECTRIC ROTARY MACHINES

[75] Inventors: Miyoshi Takahashi; Noriyoshi Takahashi, both of Hitachi, Japan

[73] Assignee: Hitachi, Ltd., Japan

[21] Appl. No.: 521,081

[22] Filed: Nov. 5, 1974

[30] Foreign Application Priority Data

Nov. 21, 1973   Japan .................. 48-130200

[51] Int. Cl.² ..................................... H02K 3/14
[52] U.S. Cl. ..................... 310/213; 310/184; 310/198; 174/32; 174/108; 336/187
[58] Field of Search ........ 310/213, 216, 179, 203–208, 310/198, 180, 184, 258, 265, DIG. 6; 336/187; 174/108, 113, 27, 32, 34, 33, 117 F, 114, 109

[56] References Cited

U.S. PATENT DOCUMENTS

| | | | |
|---|---|---|---|
| 1,653,784 | 12/1927 | Roebel | 310/213 |
| 2,760,127 | 8/1956 | Duncan | 310/DIG. 6 |
| 3,164,669 | 1/1965 | Meyerhoff | 174/32 |
| 3,188,377 | 6/1965 | Hughes | 310/213 |
| 3,260,978 | 7/1966 | Muller | 310/213 |
| 3,291,898 | 12/1966 | Sandell | 174/109 |
| 3,299,385 | 1/1967 | Stein | 336/187 |
| 3,541,361 | 11/1970 | Nola | 310/46 |
| 3,602,751 | 8/1971 | Brenner | 310/213 |
| 3,604,833 | 9/1971 | Beck | 174/27 |
| 3,647,932 | 3/1972 | Heller | 310/213 |
| 3,654,380 | 4/1972 | Tatum | 174/34 |
| 3,766,504 | 10/1973 | Yannucci | 336/187 |
| 3,800,066 | 3/1974 | Whitfill | 174/108 |

*Primary Examiner*—R. Skudy
*Attorney, Agent, or Firm*—Craig & Antonelli

[57] ABSTRACT

A novel winding assembly of the gap winding type electric rotary machine is arranged on the inner periphery of the slotless magnetic core of the machine. The winding comprises a plurality of congregated twisted strands each including a plurality of insulated thin wires. The congregated strands are twisted in opposite directions in such a manner as to offset the effect of magnetic fluxes produced in adjacent twisted strands axially thereof, thereby reducing the reactance of the winding on the one hand and dampening the vibration and propulsive force which otherwise might be generated in the electric rotary machine.

6 Claims, 22 Drawing Figures

WINDING ASSEMBLY OF GAP WINDING TYPE ELECTRIC ROTARY MACHINES

The present invention relates to a winding assembly of electric rotary machines or more in particular to that of gap winding type electric rotary machines.

In the conventional electric rotary machines, the windings of the electric rotary machine are generally supported fitted in the slots formed in the magnetic core. With the recent increase in the capacity of each electric rotary machine, however, the use is suggested of electric rotary machines of gap winding type for their superior characteristics and compactness as well as light weight, for the reasons described later.

The conventional electric rotary machines with winding slots have the disadvantage of an increased machine size with the increase in unit capacity of the machine, resulting in various limitations in manufacture, installation and the like. Nevertheless, an attempt to lessen the machine size causes a very high magnetic flux density in the gap intermediate the rotor core and stator core, so that the magnetic fluxes are concentrated and magnetic saturation occurs in partitions between adjacent windings which account for approximately half the inner periphery of the stator core, thus leading to a great iron loss and other losses attributable to the partitions. In view of the fact that the side of each winding opposed to the partition wall must withstand the entire voltage of the machine, a thicker insulating layer is required, resulting in a lower utilization factor of the winding slots. For these reasons, the disadvantage is shown in various limitations in unit capacity. As a means for aiming at a higher capacity, therefore, the use of a hydrogen cooling system or direct cooling system has been promoted. These methods, however, are accompanied by a very great number of ampere turns and requires a larger gap between the opposing two electromagnetic devices including the rotor electromagnetic device and the stator electromagnetic device if a predetermined short-circuit ratio is to be maintained from the viewpoint of voltage variation system stability, thereby further increasing the machine size.

In order to obviate the aforementioned disadvantages, an electric rotary machine of what is called gap winding type which unlike the above-mentioned conventional electric rotary machines, has no winding slots, has attracted considerable attention. The gap winding type electric rotary machines hitherto developed such as disclosed in U.S. Pat. Nos. 3,381,154 (granted on Apr. 30, 1968) and 3,405,297 (granted on Oct. 8, 1974), however, in spite of their compactness and light weight, have the disadvantages that the insulation between the windings is inconveniently deteriorated by eddy currents or axial vibration of the armature winding and other difficulties occur.

According to the present invention, there is provided a winding assembly of the electric rotary machine comprising a plurality of windings arranged on the inner peripheral surface of the magnetic core having no winding slots, each of the windings including a plurality of congregated strands each, of said strands having a plurality of insulated thin wires, the strands of adjacent windings being twisted in opposite directions.

The invention will now be described by way of example with reference to the accompanying drawings, in which.

Figure 1:
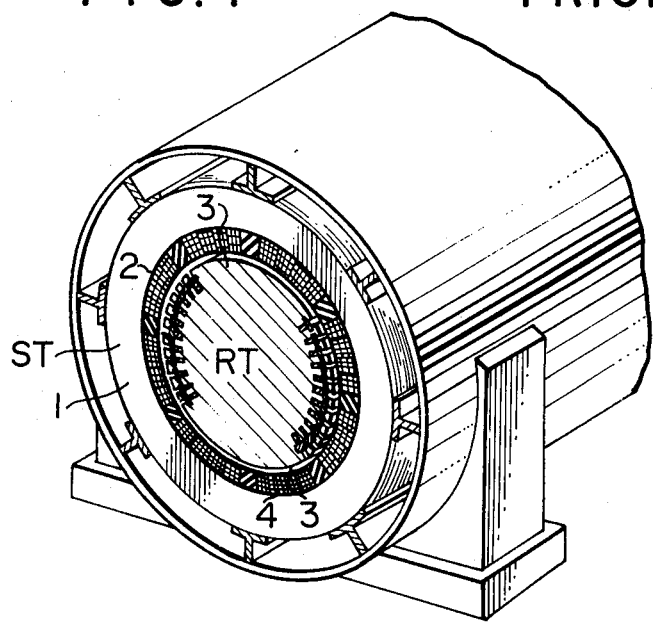
FIG. 1 is a longitudinal perspective view showing the electric rotary machine of gap winding type.
Figure 2:
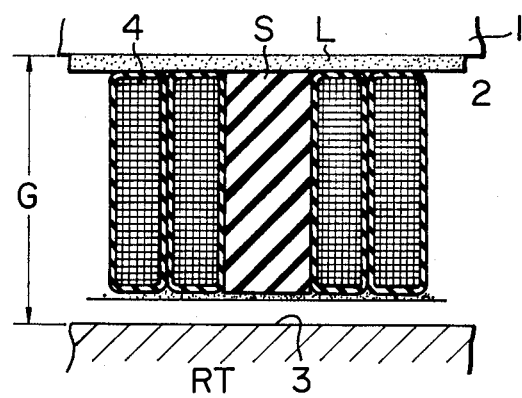
FIG. 2 and FIG. 3 are diagrams showing sections of the essential parts illustrating the manner in which the winding is arranged in the gap between rotor and stator.
Figure 3:
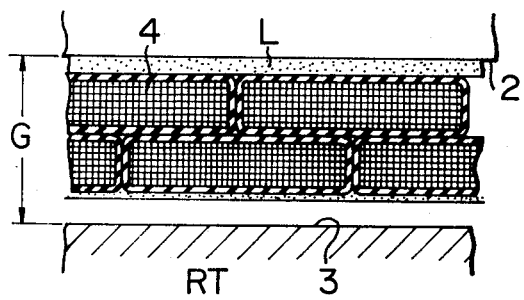

First, the prior art will be explained below with reference to FIGS. 1 to 3.

In the electric rotary machine of gap winding type such as a large capacity turbine generator, a plurality of insulated windings 4 are fixedly arranged by means of a predetermined fixing means on the inner peripheral surface 2 of a magnetic core 1 on the stator ST side or on the rotor RT side in a large gap G formed between stator ST and rotor RT. Specifically, by fixing the windings 4 on the magnetic core 1 on stator side, it is possible generally to reduce the outer diameter of the stator magnetic core 1 of the electric rotary machine by the depth of the winding slots which otherwise is required to be formed, thereby reducing the size and weight of the machine accordingly.

Figure 4:
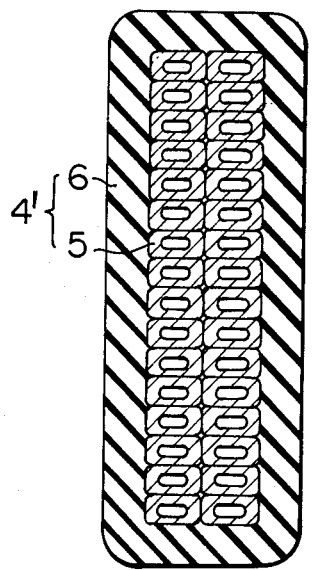
FIG. 4 and FIG. 5 are sectional diagrams of conventional windings.

In spite of this great advantage of the gap winding type electric rotary machine, the aforementioned fact that the conductors of the windings 4 are arranged in the gap G, that is, directly in the paths of magnetic fluxes causes the magnetic fluxes generated by the magnetic pole 3 of the rotor RT to be directly cut by the windings, thereby causing a large eddy current in the surface of the conductors of the windings 4. As an example, in the windings 4' having the construction as shown in FIG. 4 which has so far been in general use as the windings 4 of the gap winding type electric rotary machine, a considerably large eddy current is produced in the strands 5 and thermally deteriorates the insulating layer 6, thus making the machine unusable. In other words, an increased loss due to the skin effect is liable to adversely affect the machine output.

Figure 5:
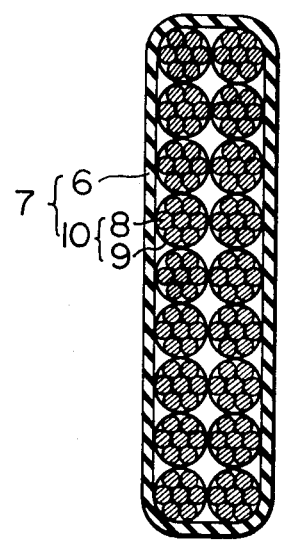

A natural result of efforts to reduce such an eddy current loss may be provision of winding 7 as shown in FIG. 5, comprising a multiplicity of congregated strands 10 encased in an earth insulating layer 6, each of the strands 10 including a multiplicity of insulated thin wires 8 covered with an insulating material 9. The windings 7 instead of the windings 4 are arranged on the inner peripheral surface 2 of the magnetic core 1 shown in FIGS. 1 to 3 with an appropriate spacer S and an insulating base L interposed between adjacent windings and between the windings and the magnetic core respectively, thereby reducing not only the eddy current loss but also the size and weight of the electric rotary machine.

The gap winding type electric rotary machine described above, even though a considerable advantage may be obtained, has the disadvantage of the difficulty which is encountered in handling the windings 7 due to the thinness of the thin wires 8 making up the windings 7. In other words, the strands 10 and windings 7 comprising the mere congregation of a multiplicity of thin wires 8 lack required rigidity and are easily deformed, making it very troublesome to connect or assemble the windings 7.

Figure 6A:
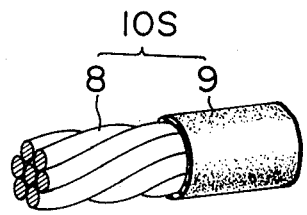
FIG. 6a is a perspective view showing twisted strands, and FIG. 6b a diagram for explaining the state of magnetic fluxes generated in the twisted strands.

An improvement in this construction is a twisted strand 10S shown in FIG. 6a, comprising a congregation of a plurality of twisted thin wires 8 covered with an insulating material 9, the twisted state eliminating deformation of the thin wires 8 and offering easy handling, as well.

Figure 6B:
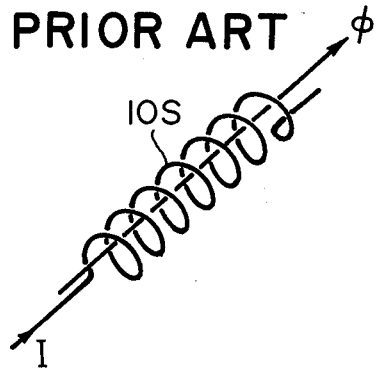
Figure 7:
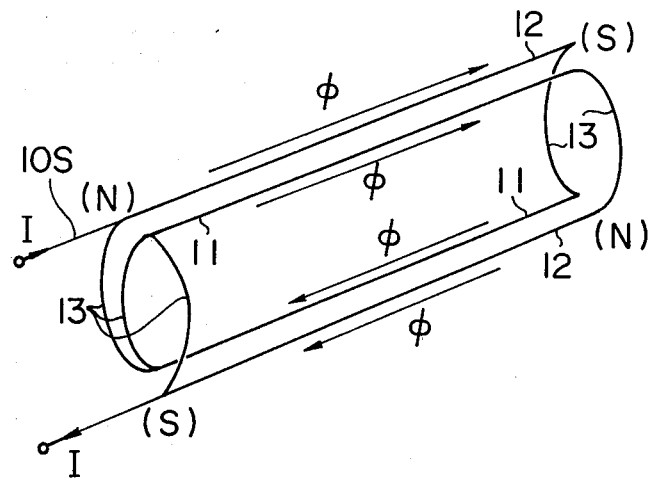
FIG. 7 is a diagram for explaining the state of axial magnetic fluxes generated in the two-layer winding comprising twisted strands.

The disadvantage of the difficulty in assembly and handling work thus eliminated by the twisted strands 10S is replaced by another disadvantage as described in the following: The thin wires 8 making up the twisted strands 10S, which extend longitudinally while forming a plurality of circles having the same radius, may be deemed to be a relatively loose solenoid as shown in FIG. 6b. Therefore, if there are any magnetic fluxes which may cut the strands 10S, a current I is induced by the magnetic fluxes which in turn generates magnetic fluxes Φ in the strand 10S, thereby forming equivalently magnetic poles at the ends of the strand 10S. As a result, assuming that the strands 10S twisted in the same direction make up the upper winding 11 and the lower winding 12 and the current flows in the direction I, magnetic fluxes Φ are generated longitudinally of the windings inside of the strands 10S, so that apparent magnetic poles (N) and (S) are formed at the effective ends of the upper winding 11 and the lower winding 12 respectively.

Explanation will be made now of the case in which the upper winding 11 and the lower winding 12 are used as armature windings of a two-pole synchronous machine, with reference to the schematic diagram of FIG. 8. The armature windings 14 held by predetermined means on the inner surface of the magnetic core 1 on stator side having no winding slots comprise strands, and therefore magnetic poles (N) and (S) are deemed to have been formed at the ends of the armature windings 14 by the magnetic fluxes generated in the strands. The magnetic poles (N) and (S) rotate along the periphery of the armature windings 14 at a synchronous speed, so that if the rotor 15 facing the stator magnetic core 1 rotates synchronously in the polar state as shown, reaction between the stator magnetic core and rotor magnetic core causes the force F for continuous axial motion of the rotor 15, thus applying propulsive force to the bearing 16 supporting the rotor 15. As a reaction to this, the reverse propulsive force F' is transmitted at synchronous speed in the armature windings 14, thereby causing axial vibrations of the armature windings 14.

Figure 8:
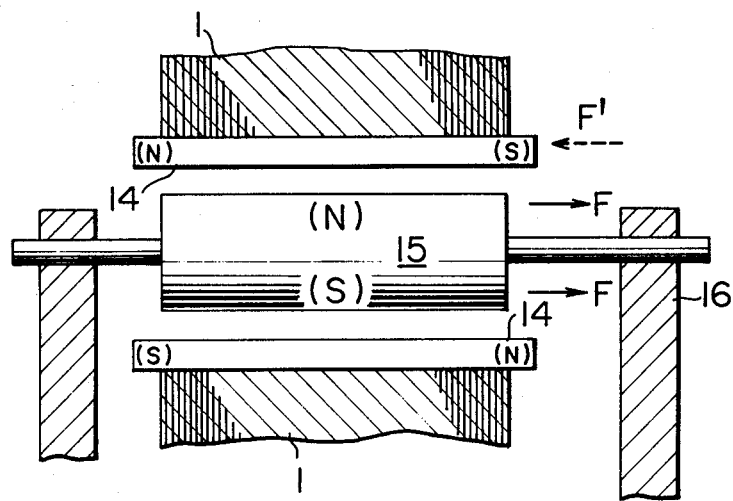
FIG. 8 is a schematic sectional diagram showing the relation between the axial magnetic fluxes generated in an electric rotary machine incorporating the winding of FIG. 7 and the force acting on the various parts thereof.

In the event that part of the armature windings 14 shown in FIG. 8 is short-circuited, the radial magnetic balance is disrupted and as a result a large bending moment acts on the rotor 15, running the risk of breaking the electric rotary machine.

Under the circumstances, the strands 10S are not suitable for use in the windings of a gap winding type electric rotary machine.

Embodiments of the present invention will be described in detail below with the accompanying drawings.

Figure 9A:
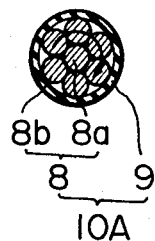
FIG. 9a and FIG. 10a are diagrams showing two examples of the construction of twisted strands making up the winding according to the present invention.
Figure 9B:
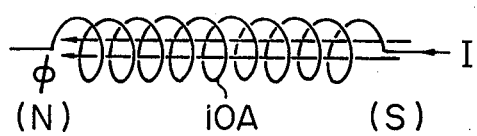
FIG. 9b and FIG. 10b are diagrams for explaining the relation between the respective twisted windings of FIGS. 9a and 10a and magnetic fluxes generated.
Figure 10A:
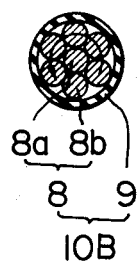
Figure 10B:
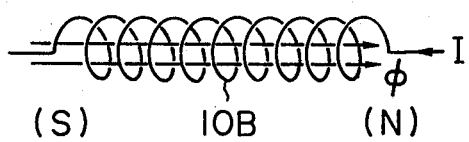

Referring first to FIGS. 9a, 9b, 10a and 10b showing a couple of strands 10A and 10B having insulated thin wires 8 twisted in opposite directions, each of the strands 10A and 10B comprises a plurality of insulated thin wires 8 and an insulating material collectively containing the thin wires 8. Also, the thin wires 8 are comprised of a center thin wire 8a and a plurality of twisted thin wires 8b collectively extending in the same direction as the center thin wire 8a, so that the strands are classified into 10A and 10B according to the direction in which the thin wires 8b are twisted. Since the thin wires of strands 10A and 10B are twisted in the directions of arrows in FIG. 9a and FIG. 10a respectively, the magnetic flux Φ is generated longitudinally of the strands 10A and 10B as shown in FIG. 9b and FIG. 10b respectively if the current I flows in the same direction in the strands 10A and 10B. The direction of this magnetic flux Φ coincides with that of the current for the strand 10A which is twisted clockwise, while it is opposite to that of the current for the strand 10B which is twisted counterclockwise. For this reason, in the event that the strands 10A and 10B are arranged adjacent to each other, such apparent magnetic poles (S) and (N) as to offset the effect of magnetic poles (N) and (S) generated at the ends of the strands 10A are formed at the ends of the strands 10B, with the result that there are virtually no magnetic poles formed at the ends of the strands 10A and 10B. This phenomenon, however, is limited to the case in which the strands 10A and 10B are subjected to the influence of external magnetic fluxes under the same conditions, in which case magnetic fluxes of the same amount are produced in the strands 10A and 10B. Actually, however, there occurs a slight difference in current generated in the strands 10A and 10B as they are not in quite the same condition because of their positions or the manner in which they are twisted, thereby leading to a slight difference in the magnitude of the magnetic fluxes Φ, resulting in apparent magnetic poles (N) and (S) being formed at the ends of strands 10A and 10B. The intensity of these apparent magnetic poles (N) and (S), however, is so small that they are far less than sufficient to cause propulsive force for or vibration of the electric rotary machine. It is indeed negligible before the overwhelming advantage that most of the magnetic fluxes generated in the strands 10A and 10B are offset by each other.

Figure 11:
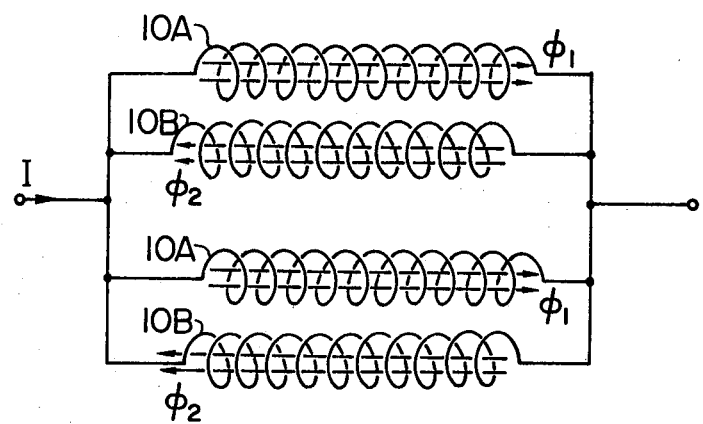
FIG. 11 is a diagram showing an equivalent circuit of the invention comprising a plurality of windings including adjacent strands twisted in opposite directions.

The diagram of FIG. 11 shows an equivalent circuit of the winding comprising an appropriate number of strands twisted in opposite directions as explained above. In the case of FIG. 11 where four twisted strands are connected in parallel, for example, two of them are strands 10A twisted clockwise and the remaining two strands 10B twisted counterclockwise. When the current I induced by variations of the external magnetic fluxes flows from left to right in the drawing, the magnetic flux $\Phi_1$ is produced from left to right in the strand 10A while $\Phi_2$ is produced from right to left in the strand 10B. Collectively, these magnetic fluxes $\Phi_1$ and $\Phi_2$ generated in the strands twisted clockwise and counterclockwise are substantially offset by each other, so that no magnetic poles sufficiently large to adversely affect the electric rotary machine are not produced at the ends of the windings comprising a plurality of such oppositely twisted strands.

It is already mentioned that the current induced in a multiplicity of twisted strands 10A and 10B depends on the exact positions of the strands 10A or 10B, the manner in which they are twisted, or on the material of the strands, resulting in an unbalanced state of the magnetic flux generated in each of the twisted strand, which must be prevented as far as possible in order to prevent magnetic poles from being formed at the ends of the windings. Thus the strands 10A and 10B twisted in opposite directions are required to be maintained in the same condition.

Figures 12A, 12B, 12C, 12D:
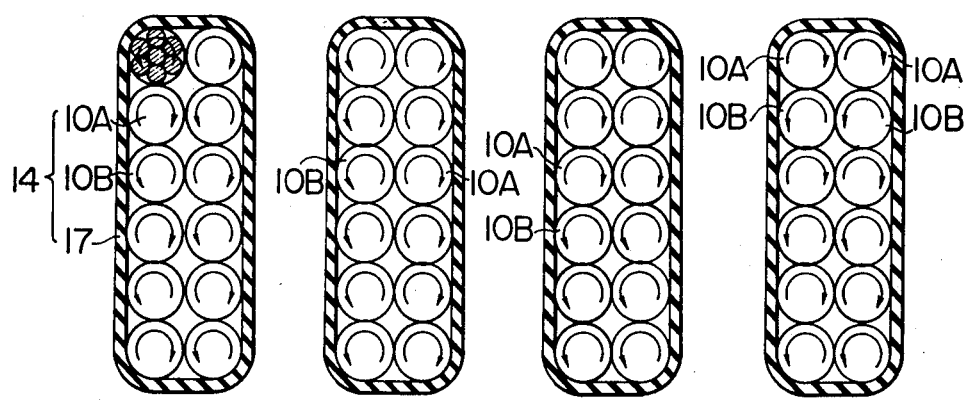
FIGS. 12a, 12b, 12c and 12d are sectional diagrams showing different strand arrangements of the winding according to the invention.

In view of the fact that the thin wires of the strands are usually twisted automatically with a machine, the twisting pitch and the outer diameter of each of the strands is fixed and also the material of the thin wires making up the strands may be considered to be uniform or the same. Therefore, the position of each strand is the only factor which may cause any unbalance in the induced current. It follows that if the twisting direction of the thin wires and the position of each strand are determined properly, it is possible to minimize the occurrence of the magnetic poles at the ends of the windings. Referring to FIG. 12a to FIG. 12d showing examples of the twisting direction of the thin wires and position of each strand, the winding 14 comprises the strands 10A with thin wires twisted clockwise and the strands 10B with thin wires twisted counterclockwise and the earth insulating layer 17. The winding 14 contains within its insulating layer 17 six layers of strands, each layer having a couple of strands 10A and 10B, and it is assumed that external magnetic fluxes are applied to the strands vertically. In the strand arrangement of FIG. 12a, adjacent strands 10A and 10B have thin wires twisted in opposite ways, whereas the arrangement of FIG. 12b is such that the right and left columns include strands 10A and 10B having thin wires twisted clockwise and counterclockwise, respectively, in such a manner that magnetic fluxes generated by every pair of horizontally adjacent strands 10A and 10B are offset with each other. In other words, vertical application of the external magnetic fluxes results in a difference between the magnitudes of current induced in and hence the intensities of the magnetic fluxes generated by the strands at higher and lower positions. In spite of this, the current and hence the magnetic fluxes of the same magnitude are produced in horizontally adjacent strands, and it is for this reason that every horizontally adjacent pair of strands 10A and 10B are twisted in opposite ways so as to offset their magnetic fluxes.

The example shown in FIG. 12c comprises the upper half strands 10A having thin wires twisted clockwise and the lower half strands 10B having thin wires twisted counterclockwise. In this case, the fact that the upper half of strands is influenced by the magnetic fluxes differently from the lower half makes it necessary to change the twisting pitch of the thin wires of either the upper or lower half strands. FIG. 12d shows a modification of the arrangement of FIG. 12c, and is intended to offset the effect of magnetic fluxes produced in vertically adjacent strands by vertically alternating between strand 10A and strand 10B pairs.

By the way, the arrangement of strands 10A and 10B is not limited to the aforementioned examples but may be modified in various ways according to the specifications of the gap winding type electric rotary machine involved.

Figure 13:
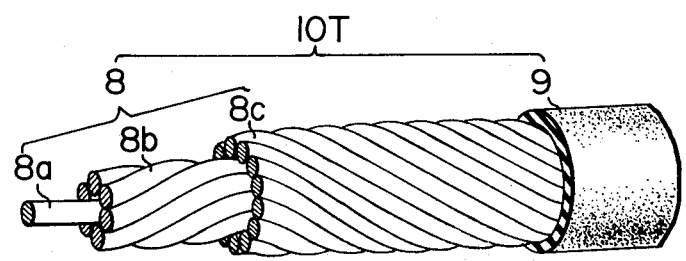
FIG. 13 is a perspective view showing another type of strands used in the winding according to the invention.

Instead of the above-described strand which is what is called "a single-layer strand" comprising a center thin wire and a plurality of twisted thin wires surrounding the center thin wire, a strand 10T as shown in FIG. 13 comprises a center thin wire 8a and two or more thin wire layers each including a plurality of twisted thin wires 8b and 8c. The strand 10T shown in FIG. 13 is so constructed that the two thin wire layers 8b and 8c around the center thin wire 8a are twisted in opposite ways and contained, together with the center thin wire 8a, in the earth insulating layer 9.

By thus providing the thin wire groups 8a and 8c twisted in opposite ways in each of the twisted strands 10T, magnetic fluxes are prevented from being generated by the twisted strand 10T. The only problem posed by this type of strand arrangement is that when a plurality of thin wire layers are involved, the difference in diameter between inner and outer layers causes different magnetic fluxes produced by them, which must be compensated for by changing the twisting pitch of such inner and outer layers. No magnetic fluxes are produced in a winding comprising a congregation of a plurality of the twisted strands 10T corrected in the aforementioned manner, nor is it necessary in such a winding to give special consideration to the way of arrangement of the twisted strands 10T.

In the case where the twisted thin wire 8b and the magnetic fluxes generated in the thin wire 8b of the twisted strand 10T are used without any adjustment, the strand 10T shown in FIG. 13 may be provided adjacent to another strand 10T whose inner and outer thin wire layers are twisted in the opposite ways, respectively, to those of the strand 10T shown in FIG. 13. That is to say, a strand 10T having an outer layer of thin wires twisted counterclockwise and an inner layer thin wires twisted clockwise is disposed adjacent to the strand of FIG. 13 in such a manner as shown in FIG. 12a to FIG. 12d thereby to maintain at zero the generation of magnetic fluxes between given adjacent strands or in the whole winding.

In the event that all the thin wire layers of a strand are twisted in the same direction, on the other hand, it will be apparent that the winding may be constructed quite the same way as the above-described single-layer twisted strand.

The diagrams of FIG. 14a to FIG. 14d show some examples in each of which a plurality of strands 10T congregated are twisted maintaining certain relationships with each other. Each of the strands has twisted thin wires in the case of FIG. 14a, a plurality of twisted strands 10E are divided into two groups which are twisted in such a manner as to offset the effect of magnetic fluxes to be generated by the respective groups. In other words, the two groups of strands 10E are twisted in opposite directions as shown by arrows, with the result that deformation of the strands 10E is eliminated thereby to produce a winding or superior mechanical characteristics. Also, the fact that the two groups of strands are twisted in opposite ways caused the offsetting of magnetic fluxes which otherwise might be produced, thus preventing magnetic fluxes from being produced. In the method shown in FIG. 14b, a plurality of strands 10E making up the winding 14 are not divided as in the case of FIG. 14a but the whole of them is twisted as a single unit. Thus magnetic fluxes opposite in direction to those produced by each of the strands 10E having twisted thin wires are produced by the whole twisted congregation of the strands 10E thereby to reduce the amount of magnetic fluxes produced in the winding as a whole. As a modification of the method of strand arrangement shown in FIG. 14b, the winding 14 may comprise a couple of winding elements 14A and 14B which are both congregations of twisted strands 10E as arranged in FIG. 14b except that the strand congregations of the two winding elements 14A and 14B are again twisted in opposite ways to greatly reduce the axial magnetic fluxes which otherwise might be produced in the whole electric rotary machine.

Figures 14A, 14B, 14C:
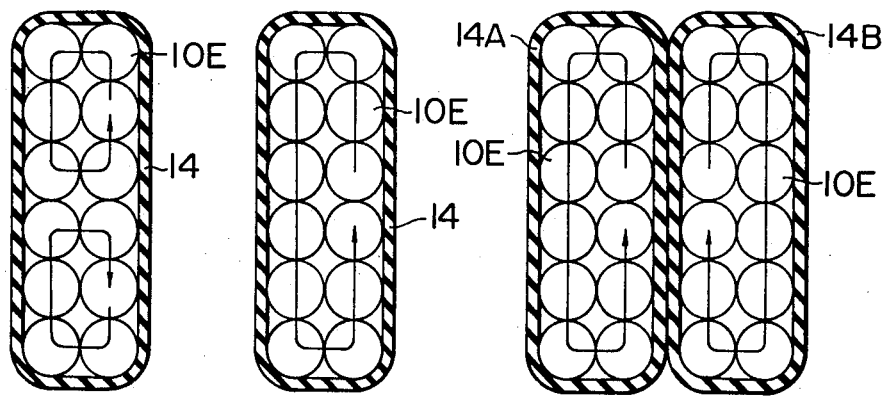
FIGS. 14a, 14b, and 14c are sectional diagrams showing the manner in which strands each comprising a plurality of thin wires are twisted.

In FIG. 14a to FIG. 14c, by the way, even if each of the strands 10E having thin wires are subtituted by a thin wire congregation, a plurality of which are twisted in the directions of arrows, it is possible to obtain the required strength of the winding and the effect of offsetting of magnetic fluxes intended for by the embodiments of the invention as covered by the scope of the invention.

Referring to the embodiments shown in FIGS. 9, 10 and 13 which are most widely used of all the above-described strand arrangements, the linear center thin wire 8a may alternatively take the form of a hollow conductor and may be utilized for the purpose of cooling the winding, or the space available between the twisted strands may be used for the same purpose of cooling.

It will be understood from the foregoing description that the winding according to the present invention comprises a congregation of strands twisted in different directions having thin wires which may or may not be twisted in different directions, and the winding is arranged on the inner surface of the magnetic core of the electric rotary machine of gap winding type, so that the eddy current loss is reduced and the deformation of the winding is prevented on the one hand while at the same time reducing not only the propulsive force or axial vibrations of the gap winding type electric rotary machine but also the reactance of the winding on the other. The reduction in eddy current loss is made possible by congregating a multiplicity of insulated thin wires of the electric rotary machine of gap winding type, while the prevention of deformation of the winding is achieved by the fact that a plurality of thin wires are not simply combined but they are divided into an appropriate number of groups each of which is twisted independently to form a strand, with the result that deformation of the thin wires is prevented, thus giving a sufficient rigidity to the windings as a whole.

Furthermore, the strands having twisted thin wires of the winding functions as a kind of solenoid whereby magnetic fluxes are generated longitudinally of the winding by means of the induced current, and as a result apparent magnetic poles are formed at the longitudinal ends of the winding, giving rise to axial vibrations of the machine as well as a propulsive force as against the other electromagnetic means, for example, as against the rotor side electromagnetic means if the apparent magnetic poles are formed on the stator side. In addition, short-circuiting may occur which causes a bending moment between rotor and stator sides, leading to a number of inconveniences. Since the present invention is such that oppositely twisted strands are used to offset the effect of magnetic fluxes generated longitudinally of the winding, substantially no magnetic poles are formed at the longitudinal ends of the winding or, if formed, they are not strong enough to produce propulsive force or axial vibration or bending moment.

Also, the above-described arrangement for off-setting or reducing the effect of magnetic fluxes generated axially in the winding naturally results in a decreased reactance of the winding.

It is thus possible according to the present invention to provide a winding arrangement which is satisfactory in every respect as a winding for the slotless electric rotary machine.

What we claim is:

1. A winding assembly of the gap winding type electric rotary machine with no winding slots having a magnetic core, said winding assembly comprising a plurality of windings arranged on the inner peripheral surface of said magnetic core, each of said windings including a plurality of congregated strands, each of said strands being a plurality of insulated thin wires, wherein said thin wires are twisted in each strand such that the number of strands having their thin wires twisted in one direction is identical with the number of strands having their thin wires twisted in the opposite direction thereby providing substantially offsetting magnetic effects.

2. A winding assembly for a gap winding type rotary electric machine with no winding slots and having a magnetic core, said winding assembly comprising a plurality of windings arranged on the inner peripheral surface of said magnetic core, each of said windings including a plurality of congregated strands, each of said strands being a plurality of insulated thin wires, wherein said plurality of thin wires of respective strands are oppositely twisted to provide offsetting magnetic effects in said windings.

3. A winding assembly for a gap winding type rotary electric machine with no winding slots and having a magnetic core, said winding assembly comprising a plurality of windings arranged on the inner peripheral surface of said magnetic core, each of said windings including a plurality of congregated strands, each of said strands being a plurality of insulated thin wires, wherein said plurality of thin wires of respective strands are oppositely twisted to provide offsetting magnetic effects in said windings, and wherein at least two groups of said strands having said twisted thin wires are twisted relative to one another within each winding to provide offsetting magnetic effects between said two groups.

4. A winding assembly according to claim 3, wherein said two groups of strands are twisted in opposite directions within each winding.

5. A winding assembly according to claim 2, wherein said plurality of strands within each winding are twisted together.

6. A winding assembly for a gap winding type rotary electric machine with no winding slots and having a magnetic core, said winding assembly comprising a plurality of windings arranged on the inner peripheral surface of said magnetic core, each of said windings including a plurality of congregated strands, each of said strands being a plurality of insulated thin wires, wherein said plurality of thin wires of respective strands are oppositely twisted to provide offsetting magnetic effects in said windings, wherein said plurality of strands within each winding are twisted together, and wherein adjacent ones of said windings have an oppositely twisted plurality of strands.

* * * * *